United States Patent [19]

Kesselman

[11] 4,037,515
[45] July 26, 1977

[54] TAMPER RESISTANT FASTENER

[76] Inventor: David A. Kesselman, 1183 Elm Ave., Sonoma, Calif. 95476

[21] Appl. No.: 717,763

[22] Filed: Aug. 26, 1976

[51] Int. Cl.² .............................................. F16B 31/02
[52] U.S. Cl. ...................................................... 85/61
[58] Field of Search ..................... 85/61, 62, 32 R, 35, 85/45

[56] References Cited

U.S. PATENT DOCUMENTS

| | | | |
|---|---|---|---|
| 641,191 | 1/1900 | Champion | 85/32 R |
| 1,447,564 | 3/1923 | Norlund et al. | 85/32 R |
| 1,696,523 | 12/1928 | Cochran | 85/32 R X |
| 2,054,060 | 9/1936 | Morris | 85/61 |
| 3,261,254 | 7/1966 | Pinkerton | 85/32 R X |
| 3,492,841 | 2/1970 | Ipri | 85/35 X |
| 3,865,246 | 2/1975 | Lieb et al. | 85/61 X |
| 3,978,761 | 9/1976 | Sosinski | 85/61 |

*Primary Examiner*—Ramon S. Britts
*Attorney, Agent, or Firm*—Shoemaker and Mattare, Ltd.

[57] ABSTRACT

A tamper resistant fastener having a stud engaging portion and a slip ring surrounding the stud engaging portion and slidably connected thereto to freely rotate thereabout. The slip ring prevents a gripping instrument from applying enough force to the stud engaging portion to allow that portion to be separated from the stud. A gripping means engaging portion is connected to the stud engaging portion by a frangible neck which breaks upon the application of a predetermined amount of torque to separate the gripping means engaging portion from the stud engaging portion. One embodiment of the invention comprises a bolt-like device.

11 Claims, 6 Drawing Figures

TAMPER RESISTANT FASTENER

BACKGROUND OF THE INVENTION

The present invention relates in general to fasteners, and more particularly, to tamper resistant fasteners.

Whenever separable pieces of equipment are attached together by fasteners, there is a possibility that an unauthorized person will separate that equipment. A common example of such separable equipment which is subject to tampering by unauthorized persons is a bicycle rack. If the rack can be separated from its mounting, the rack and the bicycles mounted thereon can be stolen. Other examples include motor mounts for boat motors, mounts for decorative automobile equipment, and the like. With the ever increasing costs of equipment, it is important to provide a means for quickly, yet positively, locking pieces of separable equipment in a manner which resists the unauthorized separation thereof.

There are several known devices for fastening separable pieces of equipment together in a manner which purports to be tamper-proof. Such devices generally include a gripping member engaging portion attached to a stud engaging portion by a breakjoint. The breakjoint is severed by the application of sufficient torque to the device, usually via the gripping member engaging portion, and the stud engaging portion is generally shaped to present a surface which is difficult to grasp with sufficient force to permit that stud engaging portion to be separated from the stud.

However, all of the known devices have a stud engaging portion which remains exposed after the gripping member engaging portion has been separated therefrom. Due to the exposed nature of these elements, there remains a distinct possibility that unauthorized persons can, somehow, grip the stud engaging portion with sufficient force to allow removal of that member from the stud, and thus to defeat the tamper-proof feature of the fastener.

The present invention provides a shield which prevents exposure of the stud engaging portion of a tamper resistant fastener once that fastener is operatively positioned.

SUMMARY OF THE INVENTION

By preventing the exposure of a stud engaging member, the device embodying the teachings of the present invention virtually eliminates the possibility that an unauthorized person will defeat the tamper resistant nature of the fastener.

The preferred form of the device embodying the teachings of the present invention comprises a threaded stud having thereon a bipartite nut formed of a gripping member engaging portion and a stud engaging portion connected together by a frangible unthreaded neck portion that acts as a breakjoint to enable the gripping member engaging portion to be separated from the stud engaging portion upon the application of a predetermined amount of torque to the nut. An alternative embodiment of the device comprises a bolt-like device.

To prevent access to the stud engaging portion once the device is operatively positioned, the device includes a freely rotatable slip ring which is engaged about the stud engaging portion to encircle same and to be freely rotatable thereabout. The slip ring has a flange which is trapped between the stud engaging portion and the surface of one of the members to be fastened together, so that the slip ring is axially immovable with respect to the stud engaging portion to prevent removal of that slip ring from the stud engaging portion. The ring is preferably cylindrical and has an inner diameter large enough so that the ring encircles the stud engaging portion of the nut and thus will be interposed between any gripping instrument and that stud engaging portion, thereby preventing access to that portion of the nut except after the slip ring has been removed therefrom.

The only exposed portion of the stud engaging portion is located within the ring and is presented axially upward. This portion is shaped to reject any gripping instrument applied thereto, thus further ensuring the tamper resistant nature of the device.

The device is thus easily placed in an operative position, and once so placed, is virtually impossible to defeat, as the only exposed surfaces are not those surfaces which are required for frictionally engaging the stud engaging portion sufficiently to separate that portion from the stud for freeing the separable members held together by the fastener.

The device can be designed to fit a large variety of studs and can be sized over a wide range. Furthermore, a wide range of torques can be selected to assure a proper fastening of the device, and the only tool required to set the device is a simple, common wrench, or the like. Once set, the device presents a pleasing appearance, and will not locate any sharp or jagged surfaces where they might be dangerous.

OBJECTS OF THE INVENTION

Accordingly, it is a main object of the present invention to provide a tamper resistant fastener which is protected from being defeated.

It is another object of the present invention to provide an easily installed tamper resistant fastener.

It is a specific object of the present invention to provide an escutcheon which is placed to be interposed between any gripping instrument and the stud engaging portion of an operatively positioned locknut.

These together with other objects and advantages which will become subsequently apparent reside in the details of construction and operation as more fully hereinafter described and claimed, reference being had to the accompanying drawings forming part hereof, wherein like reference numerals refer to like parts throughout.

DETAILED DESCRIPTION OF THE PREFERRED EMBODIMENT

Figure 1:
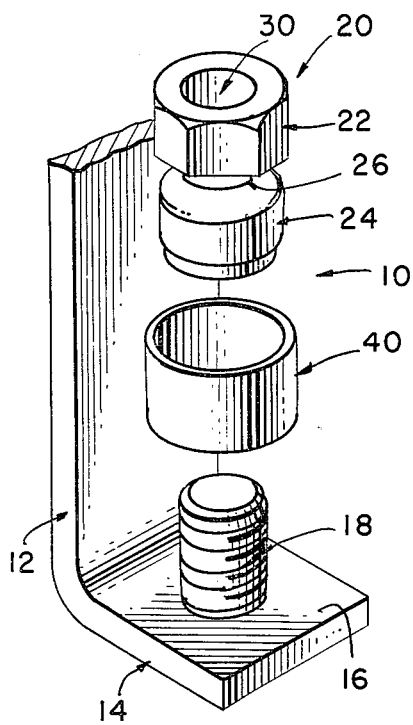
FIG. 1 is an exploded perspective view of a tamper resistant fastener embodying the teachings of the present invention.

Shown in FIG. 1 is a tamper resistant locking or fastening device 10 for securing two separable pieces together in a manner which resists the unauthorized separation thereof. A first piece, such as bracket 12 having a panel 14 with an upper surface 16, is secured to a second piece, such as a mounting means (not shown) by the locking device 10.

The device 10 comprises a male fastener, which is shown in FIG. 1 to be in the form of an externally threaded stud 18 fitted through aligned holes in the two separable parts, and a bipartite nut 20 having a wrench or gripping member engaging portion 22 and a stud engaging portion 24 interconnected by a frangible neck portion 26 which forms a breakjoint between the portions 22 and 24. Each portion of the nut 20 has a central opening, such as an unthreaded central opening 30 of the gripping member engaging portion 22, which openings are aligned and which slidably accommodate the exposed shank of the stud 18.

Encircling the stud engaging portion of the bipartite nut 20 is an escutcheon formed by freely rotating slip ring 40 which forms a protective sleeve which will be interposed between a gripping instrument and the stud engaging portion 24, as will be later explained.

Figure 2:
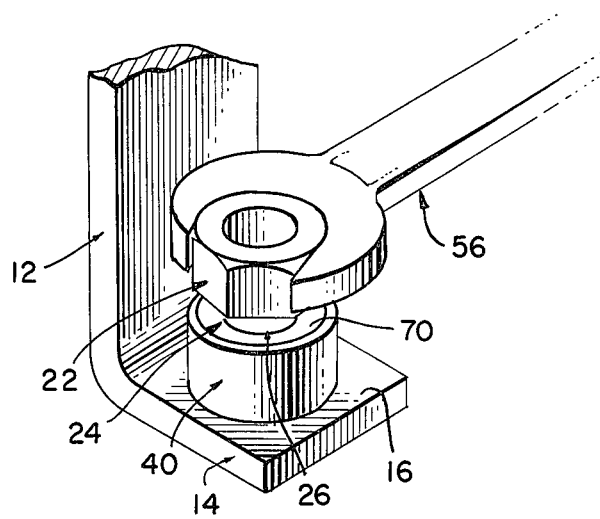
FIG. 2 is a perspective view of a tamper resistant fastener embodying the teachings of the present invention.
Figure 3:
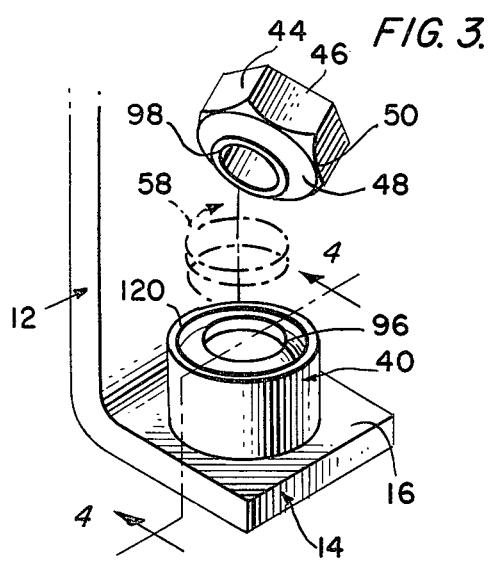
FIG. 3 is a perspective view of a separated nut of the fastener embodying the teachings of the present invention.

The gripping member engaging portion 22 is best shown in FIG. 3 and comprises a plurality of facets 44 and free top surface 46. Lower surface 48 is tapered to define a frusto-conical shape between the lower peripheral edge 50 and the neck portion 26. The gripping member engaging portion is shown as being hexagonal, but can be any other suitable shape, and is adapted to be engaged by a wrenching or gripping instrument, such as crescent wrench 56, as shown in FIG. 2 to turn the bipartite nut 20. The arrow 58 in FIG. 3 indicates the advancing direction for the nut 20 with respect to stud 18.

Figure 4:
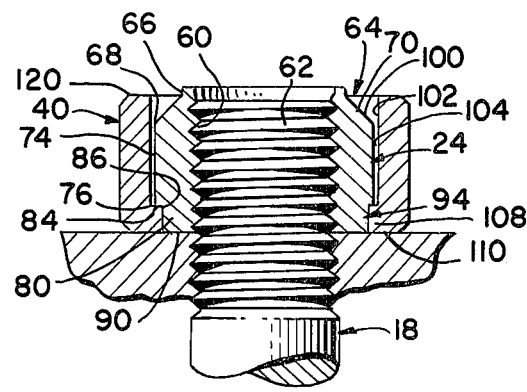
FIG. 4 is an elevation view taken along line 4—4 of FIG. 3.

The stud engaging portion is best shown in FIGS. 1 and 4 to be essentially cylindrical in outer shape and comprises a central threaded bore 60 having threads which are complemental with threads 62 on the stud 18 for threadably receiving that stud. The stud engaging portion fits onto the stud 18 to be coaxial therewith and has a top surface 64 presented upwardly with respect to panel 14. The top surface 64 is frusto-conical in shape with a top rim 66 engaging the neck portion 26 and a bottom rim 68 connected to the top rim by a sloping surface 70. An outer peripheral face 74 is essentially parallel with the central bore 60 and depends from edge 68 to an intermediate edge 76 in an essentially uninterrupted manner. A bearing portion 80 is offset radially from edge 76 toward the central bore 60 and a shoulder or slip ledge 84 is thus formed to be essentially perpendicular to face 74 and central bore 60 and connects edge 68 to an upper edge 86 of the bearing portion 80. The bearing portion depends from ledge 84 and has a lower terminal face 90 which is essentially parallel to ledge 84 and is adapted to be compressed against top surface 16 of panel 14 when the stud engaging portion is fully received on the stud 18. The offset of the bearing portion forms a counterbore 94, the function and operation of which will be later discussed. Preferably, the stud engaging portion 24 is formed of case hardened steel, or the like.

In the preferred embodiment, the inner diameter of central bore 60 is slightly smaller than the inner diameter of central bore 30, however, this diametrical relationship may be changed to suit the particular nut 20.

The breakjoint formed by the frangible neck portion 26 is best shown in FIGS. 1 and 3 and is located substantially at the midportion of the nut 20. The breakjoint is formed by a reduced thickness metal at the neck portion and is adapted to shear apart or rupture upon the application of a predetermined amount of torque between the stud engaging portion 24 and the gripping engaging portion 22, as by wrench 56, so that the stud and gripping member engaging portions are separated. This torque is any suitable value, depending on the size of the portions of nut 20, and in practice, has varied anywhere from 7 foot-pounds to 85 foot-pounds; however, other values can also be chosen. This torque can also be chosen to suitably seat the stud engaging portion onto the stud to engage top surface 16 with sufficient force to retain the fastener and portion 24 engaged during the use of the fastener.

After the neck has been separated by the application of the predetermined torque, the stud engaging portion 24 has an upstanding rim 96 surrounding bore 60 and the gripping member engaging portion 22 has a rim 98 surrounding central opening 30. The rims are formed by the complementary shorn away portions of the breakjoint or neck portion 26, as shown in FIG. 3.

The slip ring 40 is best shown in FIG. 4 and is essentially cylindrical in shape, with a central bore 100 defined therein by inner face 102 thereof for receiving the stud engaging portion 24. The inner diameter of the slip ring slightly exceeds the outer diameter of the portion 24, so that there is defined a slip gap 104 between the facially opposed surfaces 102 and 74. The slip gap enables the slip ring to rotate freely about the portion 24 to prevent a gripping member from engaging, and hence gripping, the portion 24.

The ring 40 has an axial movement preventing locking means thereon comprised of a slip flange 108 with a slip surface 110 on the lower end thereof for slipping on the top surface 16 of the panel 14. The slip flange 108 prevents movement of the ring 40 in the axial direction of the stud 18, and thus prevents removal of the ring 40 from the portion 24. Preferably, the stud engaging portion is of a sufficient length so that the free terminal end 110 of the stud is coplanar with the rim 96. Thus, the stud engaging portion cannot be gripped from inside the bore 60 to hold that portion stationary with respect to the stud 18. The flange 108 has an upper face 114 adapted to engage slip ledge 84 and has a thickness slightly less than the length of the counterbore 94. The slip flange is sized to permit the ring 40 to rotate freely, but will not be large enough to be jammed between ledge 84 and top surface 92 with sufficient force to enable the portion 24 to be turned by turning ring 40. Such a size for flange 108 is, of course, necessary to prevent the defeat of the device 10. The ring will be formed of a material having sufficient strength so that the ring cannot be crushed against the portion 24 sufficiently to allow the portion 24 to be turned through frictional engagement with the inner surface 102 of the ring 40. Thus, depending upon the mechanical properties of the ring 40, the thickness thereof will be adjusted to provide the aforementioned protection against gripping the portion 24 with sufficient force to allow that portion to be turned and separated from the stud 18.

Furthermore, the gap 104 is large enough to permit free rotation of the ring 40 about portion 24, but small enough to prevent the insertion of a jamming device, or even an adhesive, into gap 104 so that the ring 40 and the portion 24 can be rotated together. Also, an overhanging flange can be provided on the inner surface 102 adjacent edge 68 to shield that edge from being exposed sufficiently to position an adhesive in gap 104.

The ring 40 extends above the surface 64 of the portion 24 and has a top rim 120 located above edge 68 of the portion 24 to prevent gripping that edge with sufficient force to hold the portion 24 stationary with respect to the stud 18 so those elements can be separated. The rim 120 is shown in FIG. 4 to be coplanar with rim 96 of the portion 24. Thus, the sloping surface 70 is surrounded by the ring 40. The sloping surface 70 prevents the grasping of the portion 24 by any instrument with enough force to enable separation of that portion from the stud. The top rim also shields personnel from contact with the rim 96 as that rim may have a jagged edge after the portions 22 and 24 have been separated.

Thus, as can be seen in FIGS. 2 and 4, the nut 20 is advanced onto the stud 18 by gripping portion 22 with a device, such as wrench 56, and turning it in the direction of arrow 58. Once the nut is fully taken up on the stud and the face 90 is engaged against surface 92 of the flange 14, the slip flange 108 of the ring 40 is captured between ledge 85 and surface 16 and ring 40 is operatively positioned about portion 24 to encircle same in a manner which virtually prevents the gripping of that portion with sufficient force to enable it to be separated from the stud. Further torqueing of the gripping engaging portion 22 will place a shear stress on the neck portion 26. Once that shear stress exceeds the predetermined value, the neck separates and frees the gripping member engaging portion from the stud engaging portion, leaving the portion 24 firmly engaged on stud 18 with the ring securely encircling that portion, as shown in FIGS. 3 and 4.

The slip ring therefore essentially prevents the release of the stud 18 from the position thereof shown in the figures, as the stud engaging portion 24 cannot be gripped with sufficient force to enable either the stud or the portion 24 to be turned with respect to the other element. The only way that portion can be reached is by removal of the ring 40, which may be formed of either hardened or other material as is suitable for a particular application. The material may be malleable, and a suitable malleable material is aluminum. Thus, once the nut 20 is placed and separated into the operative form, the parts joined by the stud 18 are essentially permanently joined, and the nut is virtually tamper-proof.

Figures 5, 6:
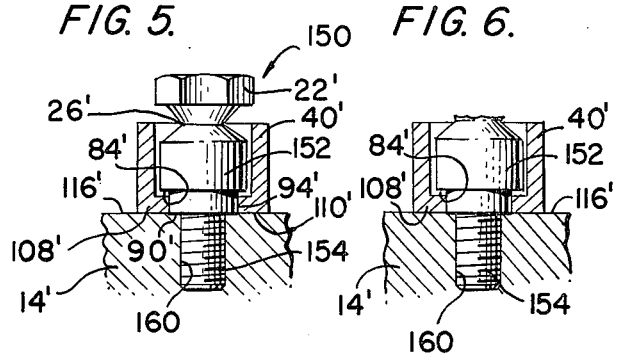
FIGS. 5 and 6 are elevation views of an alternative embodiment of the present invention.

An alternative embodiment of the present invention is shown in FIGS. 5 and 6, and comprises a bolt-like member 150 having a body section 152 with a threaded section 154 depending therefrom. A frangible neck 26′ connects a gripping member engaging section 22′ to the body 152. A freely rotating ring 40′ encircles the body 152 and comprises an axial movement preventing locking means which includes a slip flange 108′ having a slip surface 110′ on the lower end thereof for slipping on the top surface 116′ of a panel 14′. The flange 108′ is received in counterbore 94′ formed according to the same considerations as were included in the sizing and shaping of counterbore 94 in the FIG. 1 embodiment.

The FIG. 5 embodiment is thus threaded directly into a bolt-receiving hole 160 in panel 14′ by turning the gripping member engaging section 22′ and turning the member 150 similarly to the turning of member 20. When the threaded section is sufficiently taken up into the hole 160, the ledge 84′ of the ring counterbore is oriented with respect to flange 108′ as shown in FIG. 6 and lower terminal face 90′ engages surface 116′ so that the ring 40′ is trapped within the counterbore, as discussed above in regard to the FIG. 1 embodiment. Continued torqueing of the gripping member engaging section 22′ will cause the neck section 26′ to rupture so that the section 22′ can be removed and the fastener assumes the configuration shown in FIG. 6, and is tamper resistant because the slip ring 40′ prevents access to the body 152, as discussed above. Thus, while the FIG. 5 embodiment has no separate threaded stud, it does comprise the basic elements of the FIG. 1 embodiment, to wit: a removable upper section and a freely-spinning collar which prevents the type of access to the set fastener required to disengage, or remove, that fastener.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A tamper resistant fastener comprising:
   a threaded stud;
   a stud engaging means threadably engaged on said stud and being devoid of any disengaging tool accommodating means;
   a gripping means engaging portion connected to said stud engaging means for transmitting torque to said stud engaging means from the gripping means;
   a frangible neck connecting said gripping means engaging portion to said stud engaging means, said frangible neck being adapted to fracture when a predetermind torque is applied to said gripping means engaging portion to separate said gripping means engaging portion from said stud engaging means; and
   a cylindrical slip ring for preventing a gripping instrument from applying a gripping force to said stud engaging means for turning said stud engaging means to remove the fastener, said slip ring surrounding said stud engaging means and slidably connected thereto to freely rotate about said stud engaging means when said gripping means engaging portion is separated from said stud engaging means and having locking means thereon engaging said stud engaging means for preventing said slip ring from moving axially of said stud, said slip ring being spaced closely adjacent said stud engaging means about the entire periphery of said stud engaging means, said close spacing defining means preventing insertion of a disengaging device between said stud engaging means and said slip ring.

2. The fastener of claim 1, wherein said stud engaging means is cylindrical and includes a bearing portion on one end thereof which bearing portion engages a surface of a device through which said stud fits, said bearing portion being radially offset from the side surface of said cylindrical stud engaging means to define a counterbore and a slip ledge on said stud engaging means which ledge is spaced from said one end, said locking means including an inwardly directed flange surrounding one end thereof, said flange being received in said counterbore and trapped therein by said ledge and the surface for preventing said slip ring from moving axially of said stud, while allowing said slip ring to rotate freely about said stud engaging means.

3. The fastener of claim 2, wherein said stud engaging means has a sloping shoulder on the other end thereof.

4. The fastener of claim 3, wherein said slip ring has a length approximately equal to that of said stud engaging means, so that said slip ring extends above the intersection of said shoulder and the side surface of said stud engaging means.

5. The fastener of claim 1, wherein said ring is hardened steel.

6. The fastener of claim 1, wherein said gripping means engaging portion is hexagonal in shape.

7. The fastener of claim 1, wherein said stud and said stud engaging means are complementarily threaded so that said stud is threadably received in said stud engaging means.

8. The fastener of claim 1, wherein said stud has a free end and said stud engaging means has a top rim and is located on said stud so that said top rim and said stud free end are essentially coplanar with each other.

9. The fastener of claim 1, wherein said ring is formed of a malleable material.

10. The fastener of claim 1, wherein said stud and said stud engaging means are integral with each other.

11. A tamper resistant fastening means for attachment to a threaded stud portion, comprising:
  a threaded stud;
  a bipartite nut mounted on said stud and including a gripping means engaging portion, a stud engaging portion threadably engaged on said stud and being devoid of any disengaging tool accommodating means, and a frangible neck connecting said gripping means engaging portion and said stud engaging portion, said neck being adapted to break when a predetermined amount of torque is applied to said nut, thereby separating said gripping means engaging portion from said stud engaging portion; and
  a cylindrical slip ring for preventing a gripping instrument from applying sufficient force to said stud engaging portion to enable same to be rotated with respect to said stud in order to separate same from said stud, said slip ring surrounding said stud engaging portion and being spaced closely adjacent thereto about the entire periphery thereof, said close spacing defining means for preventing insertion of a disengaging device between said slip ring and said stud engaging portion and being slidably connected to said stud engaging portion to freely rotate about said stud engaging portion when said gripping means engaging portion is separated from said stud engaging portion, said slip ring having locking means thereon which engages said stud engaging portion for preventing movement thereof axially of said stud.

* * * * *